Sept. 8, 1970      J. H. LIPPMAN      3,527,437

BRACKET FOR MOUNTING A LIGHT ON A CAMERA

Filed June 10, 1968

INVENTOR
JORDAN H. LIPPMAN

BY

ATTORNEY

United States Patent Office 3,527,437
Patented Sept. 8, 1970

3,527,437
BRACKET FOR MOUNTING A LIGHT ON A CAMERA
Jordan H. Lippman, Glencoe, Ill., assignor to Harwood Electronics Co., Inc., Chicago, Ill., a corporation of Illinois
Filed June 10, 1968, Ser. No. 735,607
Int. Cl. G03b 15/03
U.S. Cl. 248—205　　　　　　　　　　2 Claims

ABSTRACT OF THE DISCLOSURE

A bracket for mounting a light on a camera is permanently affixed to a housing in which a light bulb is enclosed. The bracket may be swiveled between two different positions. In one position, one section of the bracket is interengageable with one type of attachment means on a camera, and in the other position, a different section of the bracket is interengageable with a different type of attachment means on a camera. The most popular cameras are provided with either a slot or a threaded socket as a means for attaching a housing in which a light bulb is enclosed. One section of the bracket has a tongue adapted to be interengaged with the slotted structure of one make of cameras, and the other section of the bracket has a screw adapted to be threaded into the socket of other cameras.

---

The present invention relates to a bracket for mounting a light on different makes of cameras that are provided with different attachment means, and is particularly concerned with a bracket that is permanently pivotally affixed to a housing in which a light is enclosed. The bracket may be moved pivotally between two different positions and does not have to be removed from the light housing for use with different cameras.

The two movie cameras currently most popular are provided with either a slot or a threaded socket for use in mounting a light thereon. Accordingly, the bracket of the present invention will be described as comprising one section provided with a tongue adapted to fit in the slot, and a second section having a screw adapted to be threaded into the socket. It should be understood, however, that if a camera having a different type of attachment means should become popular, either section of the bracket may be constructed for use with said different type of attachment means.

With the foregoing and other objects in view which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

Figure 1:
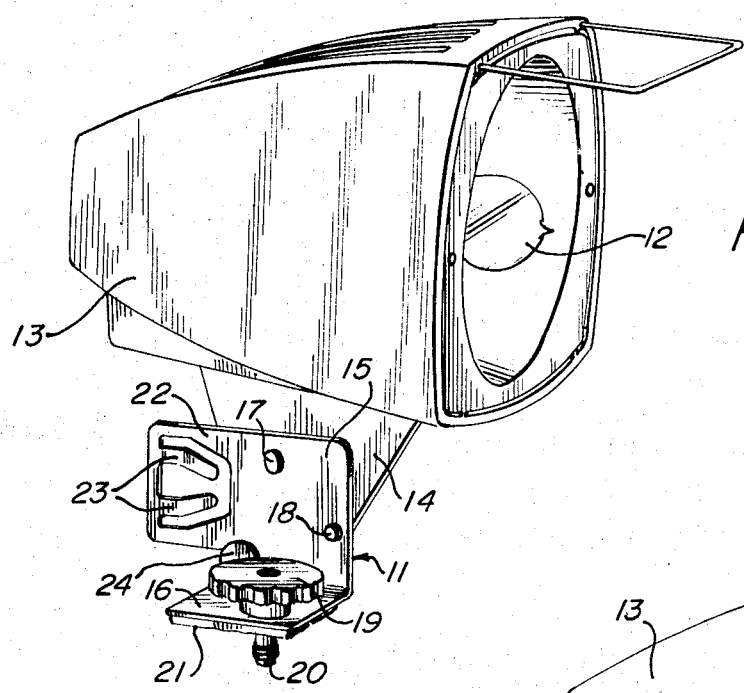
Figure 2:
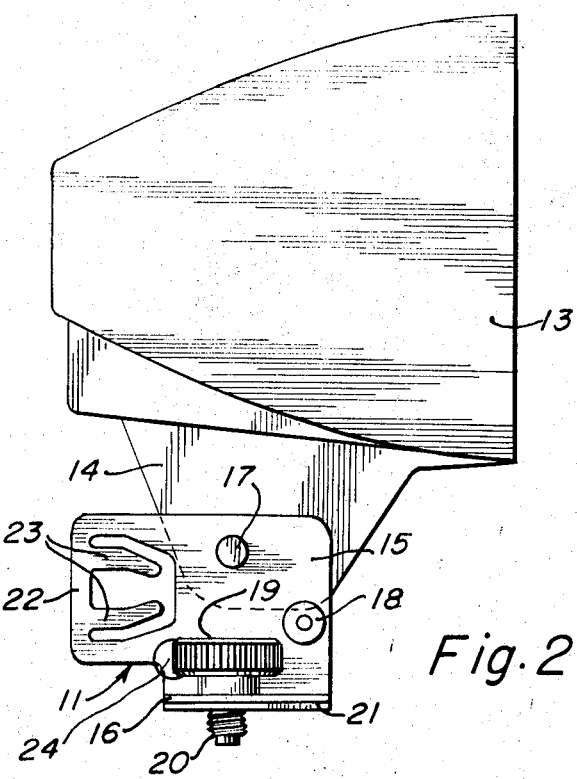
Figure 3:
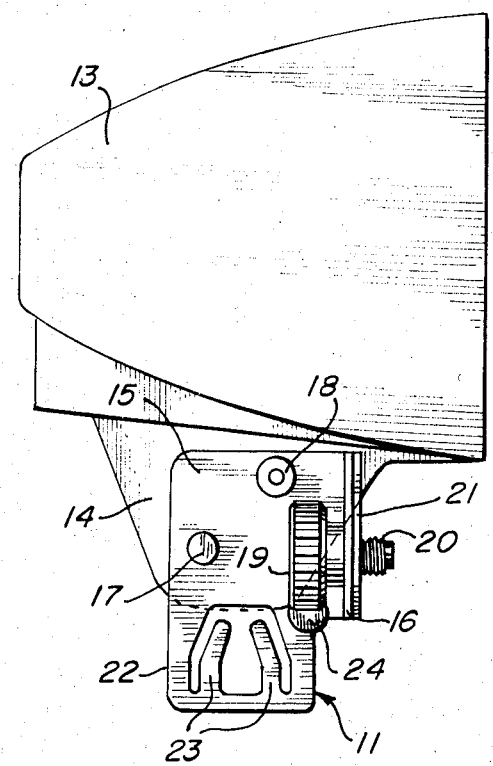

FIG. 1 is a perspective view of a light and a mounting bracket attached thereto;
FIG. 2 is side elevational view of the structure of FIG. 1; and
FIG. 3 is a view, similar to FIG. 2, showing the mounting bracket in a different position.

In the drawings, a bracket 11 is adapted to mount a light 12 on cameras having either a slot or a threaded socket as attachment means. The camera and the light are both of conventional form, and will not be described except for the structure relating directly to the bracket. The light includes a housing 13 having a web 14 depending therefrom.

The bracket 11 comprises two flat sections 15 and 16 that extend at right angles to each other. The section 15 is juxtaposed against one side of the web 14 and is permanently secured thereto by a pivot pin 17. The pivot pin permits the bracket to be swiveled between two positions. In one position of the bracket the section 16 is horizontally disposed, and in the other position, the section 16 is vertically disposed. A retractable spring pressed pin 18 projects through an aperture in section 15. The pin 18 is so located that when the bracket is positioned with the section 16 horizontally disposed, it engages the lower edge of the web 14 to the right of the pivot pin 17, as viewed in FIG. 2. The pin 18 prevents the light housing from moving clockwise about the pivot pin 17 and thus holds the light in proper position relative to the camera on which it is mounted.

A thumb screw 19 extends through an aperture in the section 16 and is threaded, as indicated at 20, so that it can be engaged with a threaded socket in the camera to hold the light in place. The section 16 preferably has a cushioning member 21 secured to its lower face to protect the top surface of the camera when the screw 20 is tightened.

If the camera on which the light is to be mounted has a slot instead of a threaded socket, the pin 18 is retracted, and the bracket is rotated counterclockwise through 90° about its pivot 17. The lower end portion 22 of the section 15 may then be inserted in the slot provided therefor in the camera. This portion of section 15 is cut out to form a pair of tongues 23 adapted to interengage the structure of the camera within the slot. In this position of the bracket, another pin 24 that projects through the section 15 engages the edge of the web 14 to the right of the pivot 17, as viewed in FIG. 3, to hold the light housing against accidental clockwise pivotal movement about its pivot 17.

It is believed that my invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of my invention as defined in the appended claims.

I claim:
1. A bracket for mounting a light housing on a camera, said light housing having a flat web projecting therefrom,
said bracket comprising two sections extending at right angles to each other,
a pivot pin pivotally securing said bracket to said light housing with one of said sections juxtaposed against one side of said web whereby said bracket may be swiveled between two positions relative to said web,
means on said one section for interegagement with a slotted structure provided therefor in a camera,
means on said other section for interengagement with a threaded socket provided therefor in a camera,
and means on said first mentioned section engageable with said web to hold said bracket and said light housing in each of said positions,
said pins being so spaced relative to said pivot pin as to engage one edge of said web in each position of said bracket and thereby prevent pivotal movement of said light housing in one direction relative to said bracket.

2. A bracket as recited in claim 1, in which one of said pins is spring pressed, whereby it may be retracted from its aperture to permit pivotal movement of said light housing in said one direction relative to said bracket.

References Cited
UNITED STATES PATENTS
2,954,909 10/1960 Miller et al. _____ 248—291 X
3,333,093 7/1967 Robinson _____ 240—1.3

FOREIGN PATENTS
621,846 5/1927 France.

ROY D. FRAZIER, Primary Examiner
J. F. FOSS, Assistant Examiner

U.S. Cl. X.R.
95—86; 240—1.3